United States Patent

Shirai

[11] Patent Number: 5,947,605
[45] Date of Patent: Sep. 7, 1999

[54] LINEAR MOTION GUIDE APPARATUS EQUIPPED WITH A PLURALITY OF ROWS OF BALL CHAINS

[75] Inventor: Takeki Shirai, Ichikawa, Japan

[73] Assignee: THK Co., Ltd., Tokyo, Japan

[21] Appl. No.: 09/011,699

[22] PCT Filed: Jun. 18, 1997

[86] PCT No.: PCT/JP97/02096

§ 371 Date: Apr. 13, 1998

§ 102(e) Date: Apr. 13, 1998

[87] PCT Pub. No.: WO97/48913

PCT Pub. Date: Dec. 24, 1997

[30] Foreign Application Priority Data

Jun. 18, 1996 [JP] Japan .................................. 8-177388

[51] Int. Cl.[6] .................................................. F16C 29/06
[52] U.S. Cl. .................................................. 384/45
[58] Field of Search ........................... 384/45, 44, 43, 384/49

[56] References Cited

U.S. PATENT DOCUMENTS 5,059,037  10/1991  Albert ........................................ 384/45
5,755,516   5/1998  Teramachi et al. ........................ 384/45

FOREIGN PATENT DOCUMENTS 126149   5/1993  Japan .
317762  12/1995  Japan .

Primary Examiner—Thomas R. Hannon
Attorney, Agent, or Firm—Armstrong, Wsterman, Hattori, McLeland & Naughton

[57] ABSTRACT

A linear motion guide device provided with a plural ball row chain capable of achieving easy assembling working and realizing an improved smooth ball circulation.

It is characterized that ball retainer members 23, 23 to which one sides of the respective two ball rows 3, 3 arranged along loaded ball rolling grooves 10, at a time of removing a movable block 4 from a track rail 1, are formed to the movable block 4, the falling-off of the balls in the ball rows can be prevented by the assembling of the ball retainer members 23, 23 and a plural ball row chain 20, and the hanging-down of an end portion of the plural ball row chain 20 can be also prevented.

5 Claims, 3 Drawing Sheets

(a)

23 ball retainer member (b)

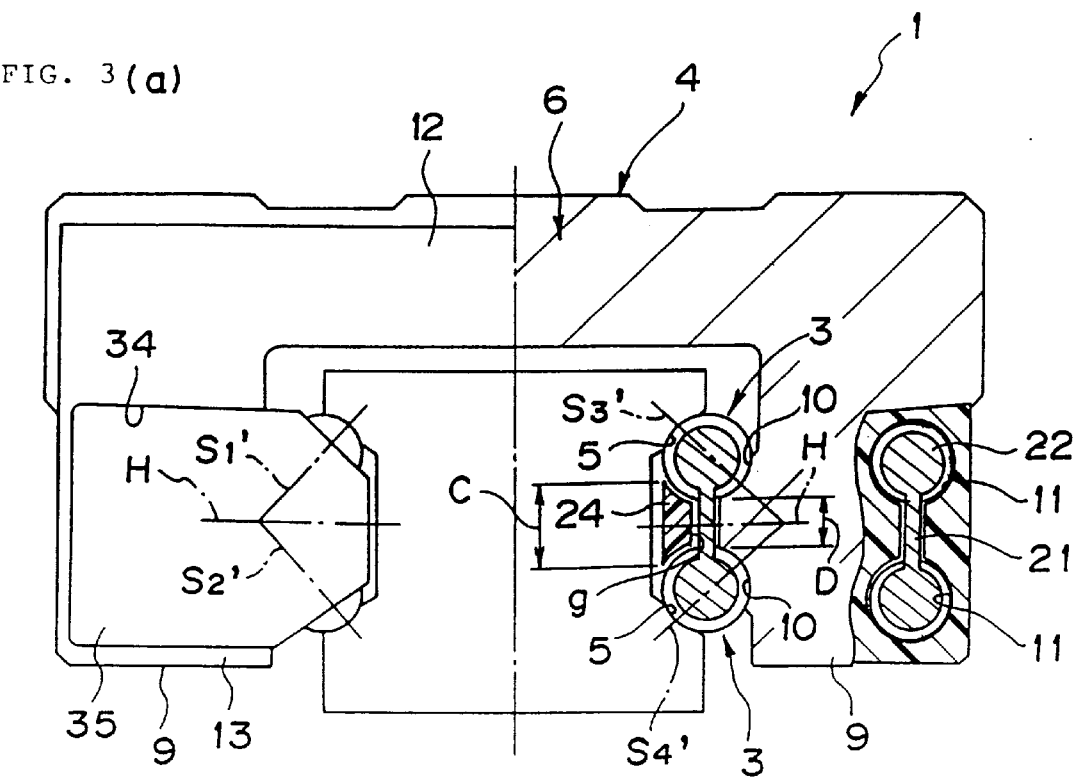
FIG. 3(a)
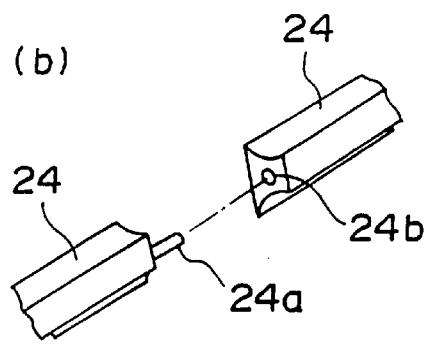
(b)
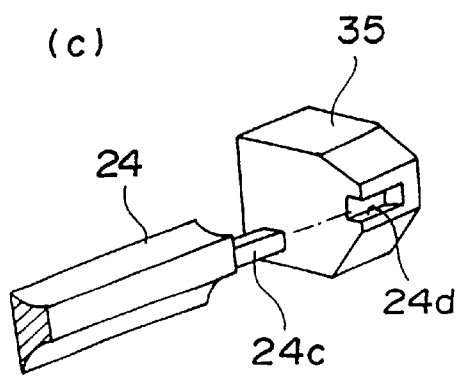
(c)

LINEAR MOTION GUIDE APPARATUS EQUIPPED WITH A PLURALITY OF ROWS OF BALL CHAINS

TECHNICAL FIELD

The present invention relates to a linear motion guide device, particularly, having a plural ball row chain holding two rows of balls.

BACKGROUND ART

In a conventional art, as a linear motion guide device of this kind, the same applicant as that of the present invention had already proposed a linear motion guide device assembled with a chain for holding plural rows of balls in which two ball rows are held by one ball chain (see Japanese Patent Laid-open Publication No. HEI 5-126149). That is, this linear motion guide device is provided with a track rail and a movable block mounted to the track rail to be movable through a number of balls.

The movable block is composed of a movable block body having a loaded ball rolling groove corresponding to a loaded ball rolling groove formed to the track rail and a non-loaded ball return passage formed in parallel thereto and end plates disposed to both ends of the movable block body and adapted to form an endless ball circulation passage communicating the loaded ball rolling groove and the rolling member return passage.

The balls constitute two ball rows separated from each other with a predetermined distance and in parallel to each other, and these two ball rows are held by a plural ball row chain to thereby circulate in the endless circulation passage. The plural ball row chain has a structure composed of a flexible connection member disposed between two ball rows and spacer members located at both side edge portions of the connection member and adapted to be inserted into balls of the respective ball rows so as to smoothly perform the circulation of the balls.

However, in the conventional technique mentioned above, because the plural ball row chain is formed from a belt-shaped member having a cut end portion, the end portion of the ball chain hangs down at a time when the movable block is removed from the track rail.

In a state that the end portion of the chain hangs down, when only the movable block is assembled with a table or the like, the hung end portion of the chain may be engaged with the table, which may result in that the plural row ball chain is withdrawn from the movable block or, otherwise, is twisted or clamped thereby, thus providing a troublesome working problem and, in a certain case, damaging the ball chain.

Further, although the respective ball rows are circulated in alignment through the spacer members of the ball chain, the smooth circulation movement of the ball may be blocked in the presence of stepped portions, caused by, for example, assembling error, at connection portions between the loaded ball rolling groove and a direction changing passage inner periphery guide portion and between the direction changing passage and the non-loaded ball return passage.

Furthermore, there may easily be caused a positional error of an outer periphery guide portion with respect to the inner periphery guide portion of the movable block body by an assembling error at the time of clamping the end plates or self-deformation of the end plates. Since the end portion of the outer periphery portion approaches the loaded ball rolling groove of the track rail and constitutes a scooping portion for scooping the balls, it is necessary to make such error as small as possible in order to perform further smooth circulation of the balls. Particularly, in the case of two ball rows, it is necessary to exactly set a pitch between the direction changing passage outer periphery guide portions of the end plates corresponding to two rows of loaded ball rolling grooves. However, in the conventional technology, the end plates have been formed through a molding process, so that it is extremely difficult to exactly perform a molding working because of deformation due to burr of a material in the molding process, and there is a limit for enhancing a mounting performance.

The present invention has been proposed to solve such problems in the conventional technique mentioned above and an object thereof is to provide a linear motion guide device having a plural ball row chain capable of being easily assembled and achieving an improved circulation of balls.

DISCLOSURE OF THE INVENTION

To achieve the above objects, according to the present invention, there is provided a linear motion guide device, provided with a plural ball row chain, which comprises a track rail and a movable block mounted to the track rail to be movable through a number of balls, the movable block comprising a movable block body provided with a loaded ball rolling groove corresponding to a loaded ball rolling groove formed to the track rail and a non-loaded ball return passage disposed in parallel to the loaded ball rolling groove of the movable block body and also provided with a direction changing passage forming members formed at both the ends of the movable block body and constituting ball direction changing passages forming an endless ball circulation passage communicating the loaded ball rolling groove and the rolling member return passage, the balls being composed of at least one set of two ball rows in parallel to each other with a predetermined space and the two ball rows being supported by a belt-shaped plural ball row chain enabling the balls to circulate the endless ball circulation passage, the plural ball row chain being composed of a flexible connection member disposed between the two ball rows and spacers disposed at both side edges of the connection member and adapted to be inserted into adjacent balls, wherein a ball retainer portion is disposed to the movable block body so that the balls in respective ball rows along the loaded ball rolling groove are engaged at a time of removing the movable block from the track rail and the balls are prevented from falling off through an assembling of the ball retainer portion and the plural ball row chain.

According to the present invention, the assembling of the balls in the movable block is done by holding predetermined numbers of balls by the plural ball row chain, which is then inserted into the movable block body, now not assembled with the track rail, through the end portion of the plural ball row chain. Accordingly, by assembling the balls into the movable block through the plural ball row chain, the assembling working of the necessary numbers of balls can be done accurately and quickly without falling-off of the balls and the assembling workability can be also improved.

Furthermore, at the time when the assembling of the plural ball row chain has been completed, the balls of two ball rows exposed to the loaded ball rolling groove of the movable block to which the track rail is not assembled are supported by the spacers of the plural ball row chain positioned between the adjacent balls. One side of the ball row supported by the plural ball row chain is engaged with the ball retainer, and the balls are hence prevented from falling off by means of the plural ball row chain, and furthermore, the hanging-down of the end portion of the plural ball row chain can also be prevented.

Accordingly, in a case where the movable block is assembled to a table with the track rail being not inserted, there is no fear of falling-off of the plural ball row chain from the movable block and the assembling working can be hence quickly performed.

Furthermore, the ball retainer portion includes two retainer members disposed to side edge portion opposing to the location of the connection member of the plural ball row chain and an opening width of the retainer member is set smaller than a maximum width between balls of the respective ball rows.

According to this structure, two ball rows supported by the plural ball row chain can be held together with the plural ball row chain by the two ball retainer members positioned outside the plural ball row chain.

This structure is preferred for a contact angle structure in which a contact angle line connecting contact points of two ball rows to the loaded ball rolling grooves of the movable block and the track rail is inclined in a direction closed towards the track rail.

Furthermore, the ball retainer members are disposed between the two ball rows, a maximum width between the retainer members is set larger than a minimum width of two ball rows and a gap through which the connection member of the plural ball row chain passes is formed between the ball retainer portion and the movable block body.

In this structure, two ball rows held by the plural ball row chain are held together with the plural ball row chain by both the side edges of the ball retainer portion positioned inside the plural ball row chain.

This structure is preferred for a contact angle structure in which a contact angle line connecting contact points of two ball rows to the loaded ball rolling grooves of the movable block and the track rail is inclined in a direction opened towards the track rail.

Furthermore, a return passage forming portion constituting the non-loaded ball returning passage corresponding to the two ball rows, a direction changing inner periphery guide portion forming portion constituting an inner periphery guide portion of the ball direction changing passage, and a ball retainer forming portion constituting ball retainer members are constituted by a circulation passage forming portion integrally formed by inserting the movable block body into a mold.

According to this structure, the connected portions between the non-loaded ball return passage and the direction changing passage inner periphery guide portion and between the direction changing passage inner periphery guide portion and the loaded ball rolling groove can be formed as continuous surfaces with no stepped portion, thus performing smooth ball circulation. Furthermore, since the ball retainer portion can be exactly positioned, the balls do not contact the retainer portion at the ball rolling time and the balls can hence roll smoothly.

Furthermore, the direction changing passage inner periphery guide portion forming portion is composed of an end surface forming portion integrally formed with an end surface of the movable block body inclusive of the direction changing passage guide portion and an area in the vicinity thereof, a recessed portion exposing the direction changing passage inner periphery guide portion corresponding to ball rows is formed to the end surface forming portion, a deflector formed with an outer periphery guide portion of a rolling member rolling direction changing passage is engaged with the recessed portion, and the rolling member rolling direction changing passage is composed of the inner periphery guide portion and the outer periphery guide portion.

According to this structure, the deflector can be positioned by the recessed portion formed to the end surface forming portion integrally formed to the movable block body, and the outer periphery guide portion of the ball direction changing passage can be also positioned by the end surface forming portion. Since the recessed portion is integrally formed with the movable block body, the positional relationship to the loaded ball rolling groove can be exactly set.

Furthermore, the assembling working of the plural ball row chain can be easily done by inserting the same through the recessed portion, reducing the chain assembling working time.

BRIEF DESCRIPTION OF THE DRAWINGS

FIG. 3(*a*) is a sectional view of a linear motion guide device according to another embodiment of the present invention, and FIGS. 3(*b*) and 3(*c*) are views showing connection structures of a ball holding portion.

BEST MODE FOR EMBODYING THE INVENTION

Hereunder, the present invention will be described through exemplary embodiments with reference to the accompanying drawings.

Figure 1:
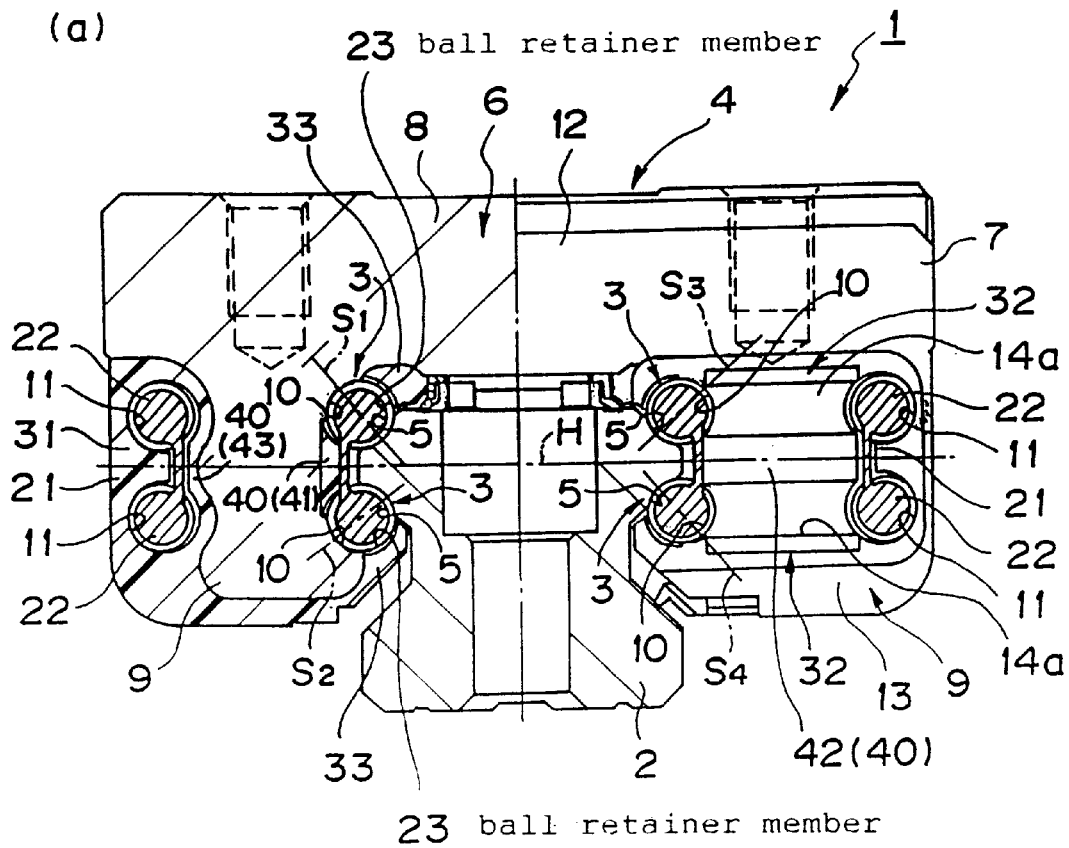
FIG. 1 is a view showing a linear motion guide device according to one embodiment of the present invention, in which FIG. 1(*a*) is a half elevational section and FIG. 1(*b*) is a half cross section showing an end face portion.
Figure 1:
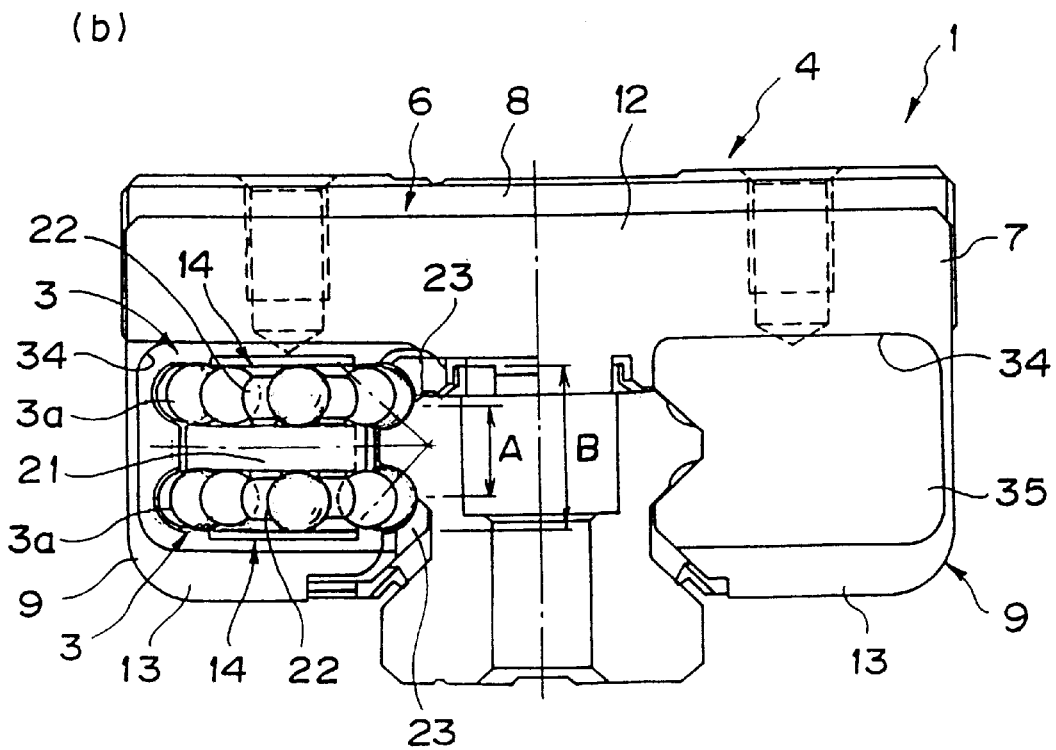
Figure 2:
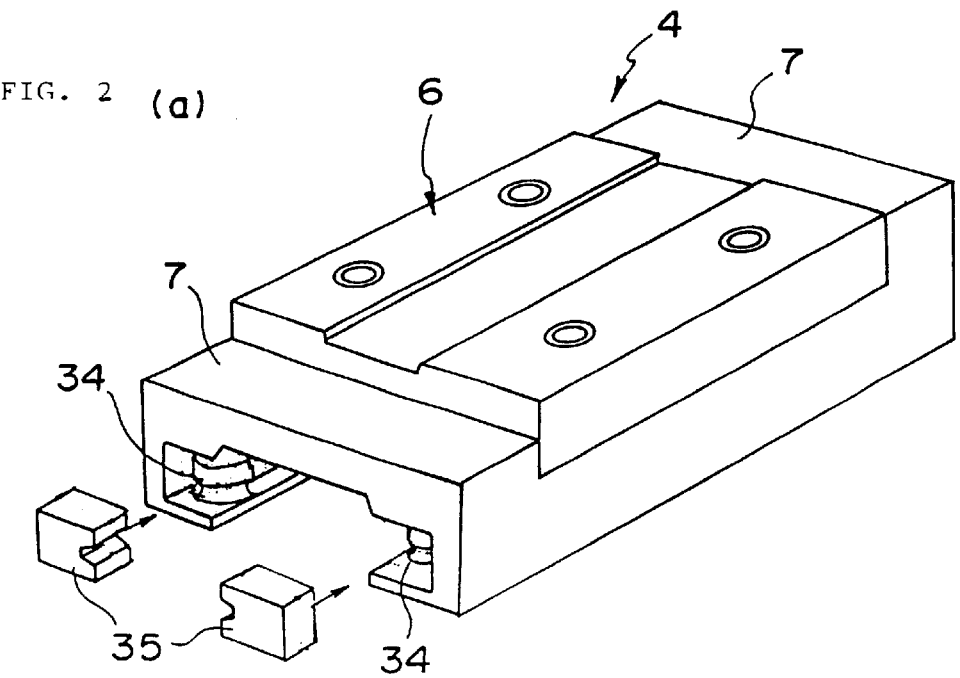
FIG. 2(*a*) is a schematic perspective view showing an inserting state of a deflector of a movable block, FIG. 2(*b*) is a sectional view of an endless circulation passage, FIG. 2(*c*) is a perspective view showing a portion of a chain for plural ball row chain, and FIG. 2(*d*) is a partial plan view.
Figure 2:
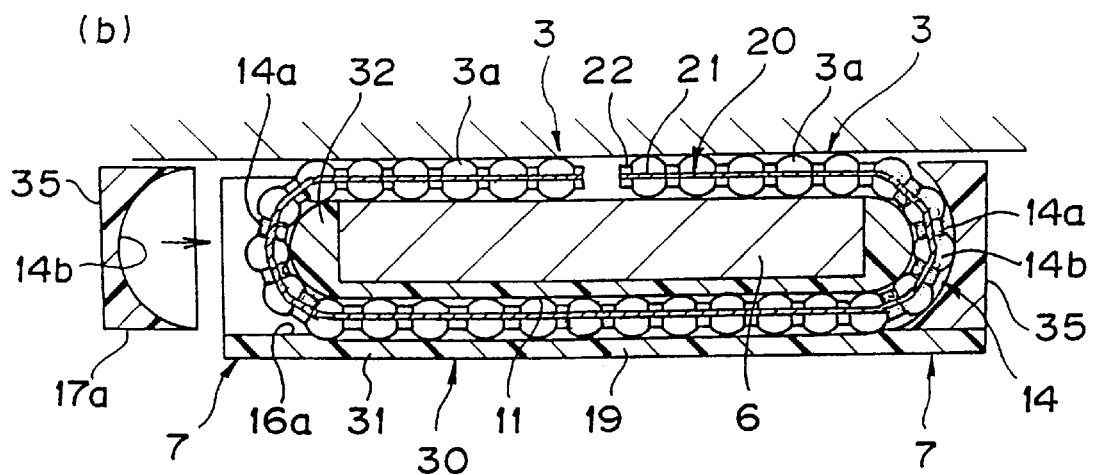
Figure 2:
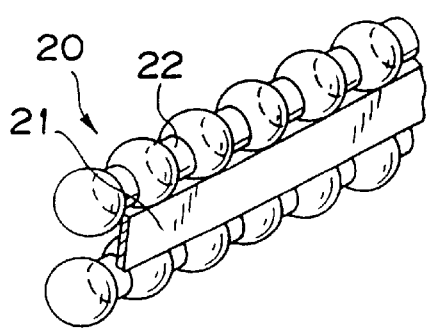
Figure 2:
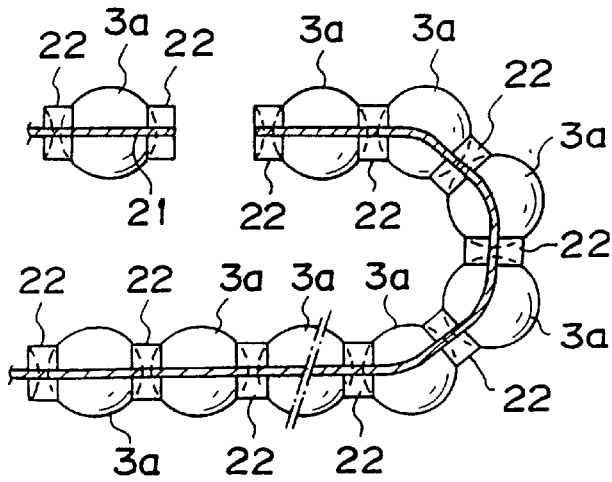

FIGS. 1 and 2 represent a linear motion guide device provided with plural ball row chain according to the present invention.

Referring to FIG. 1, reference numeral 1 denotes an entire structure of a linear motion guide device, and the linear motion guide device 1 is generally composed of a track rail 2 and a movable block 4 disposed to be movable, through a number of balls 3*a* as rolling members, with respect to the track rail 2.

The track rail 2 is formed of a member having a long length in its longitudinal direction and forming so as to provide a ]-shape in section. The track rail 2 has bilateral left and right side surfaces along which the movable block 4 is guided through a pair of two ball rows, totally four ball rows 3, 3, 3, 3, and the bilateral side surfaces are formed with four rows of loaded ball rolling grooves 5, 5, 5, 5 along the longitudinal length of the track rail at positions corresponding to the four ball rows 3, 3, 3, 3, respectively. Each pair of these ball rolling grooves 5, 5 and 5, 5 are formed in an vertical arrangement, in an illustrated state, at each of the bilateral side surfaces of the track rail 2 with a projected portion, projecting sideaway at an upper portion of each side surface, being interposed therebetween.

The movable block 4 is composed of a movable block body 6 and end plates 7, as direction changing passage constituting members, to be disposed at both ends of the movable block body 6. The movable block body 6 is a block member providing a ]-shape in section having a horizontal portion 8 facing an upper surface of the track rail 2 and a pair of supporting leg portions 9, 9 facing the right and left side surfaces of the track rail 2. The supporting leg portions 9, 9 have inner side surface portions formed with loaded ball rolling grooves 10, 10, 10, 10 corresponding, in locations, to the loaded ball rolling grooves 5, 5, 5, 5 formed to the bilateral side surfaces of the track rail 2. Four ball return passages 11, 11, 11, 11 are linearly formed to solid portions of the respective supporting leg portions 9, 9, in parallel to the corresponding loaded ball rolling grooves 10, 10, 10, 10, respectively.

The end plate 7 also provides a ]-shape in section as like the movable block body 6 and is composed of a horizontal portion 12 corresponding to the horizontal portion 8 of the movable block body 6 and skirt portions 13, 13 corresponding to the supporting leg portions 9, 9 of the movable block body 6. The skirt portions 13, 13 of the end plate 7 is formed with ball direction changing passages 14, 14, 14, 14 communicating the loaded ball rolling grooves 10, 10, 10, 10 and the ball returning passages 11, 11, 11, 11, thus constituting the endless ball circulating passages at both ends of the movable block body 6.

Contact angle lines S1, S2, S3, S4 connecting contact points of bilateral two, totally four, ball rows 3, 3 and 3, 3 to the corresponding ball rolling grooves 5, 5, 5, 5 and 10, 10, 10, 10 have inclinations bilaterally symmetrically in directions narrowing distances towards the track rail side with respect to the horizontal line H passing the central portion of the upper and lower vertical ball rows so as to provide outwardly opened contact structure. Contact angles constituted by these contact angle lines S1, S2, S3 and S4 and the horizontal line H are set to about 45°, thus providing a load supporting property for substantially equally supporting the load from vertical and horizontal directions, i. e. substantially every direction.

The respective right and left two rows of balls 3, 3 and 3, 3 are circulated through the endless circulation passage with being supported by two plural ball row chains 20, and each of plural ball row chain 20 is composed of a flexible connection member 21 disposed between two rows of balls 3, 3 and spacer members 22 attached to both side edges of the connection member 21 and adapted to be inserted into adjacent two balls 3a in each ball row 3. The plural ball row chain 20 is formed from a flexible linear belt-shaped member and both the ends thereof are not connected and are separated.

Two ball retainer members 23, 23 for preventing the balls 3a from falling off at a time of removing the movable block 4 from the track rail 1 are disposed to a side edge portions, i. e. upper and lower side edge portions in the illustrated embodiment, opposing to the connection member 21 of the plural ball row chain 20 for the ball rolling grooves 10, 10, 10, 10 of the movable block side through which two ball rows 3, 3 are rolled. According to the combination of the two ball retainer members 23, 23 and the plural ball row chain 20 prevents the balls 3a in the respective ball rows from falling down. An opening width between the respective ball retainer members 23, 23 is set to a value smaller than the maximum width between the respective ball rows 3, 3.

According to the present invention, the assembling working of the respective ball rows 3, 3 in the movable block 4 is performed by supporting predetermined numbers of the balls 3a by the plural ball row chain 20 and inserting the balls 3a into the movable block 4, to which the track rail 1 has not been assembled, through the end portion of the plural ball row chain 20. According to the manner that the balls 3a are assembled into the movable block 4 through the plural ball row chain 20, the necessary numbers of the balls 3a can be assembled acurately and promptly without falling off, thus improving the workability in the assembling working.

Furthermore, in the state that the assembling of the plural ball row chain 20 has been completed, the balls in the bilateral two rows exposed in the loaded ball rolling grooves 10, 10, 10, 10 of the movable block 4, which has not been assembled with the track rail, are supported by the spacer members of the plural ball row chain 20 disposed between the adjacent balls, respectively. One side portions of the respective two rows 3, 3 and 3, 3 of balls 3a supported by the plural ball row chain 20 are engaged with the ball retainer members 23, 23 and 23, 23 disposed at both the upper and lower side edge portions of the respective loaded ball rolling grooves 10, 10, and the balls 3a can hence be prevented from falling off by means of the plural ball row chain 20. Furthermore, the hang-down of the end portions of the plural ball row chain 20 can be also prevented.

Accordingly, in a case where the movable block 4 is assembled with a table with the track rail 1 being not inserted, there is no fear of falling off of the plural ball row chain 20 from the movable block 4, thereby smoothly performing the assembling working.

Furthermore, a pair of bilateral return passage forming portions 31, 31 forming the non-loaded ball return passages 11, 11 and 11, 11 corresponding to the respective bilateral two ball rows 3, 3 and 3, 3; a pair of bilateral direction changing passage inner periphery guide portion forming portions 32, 32 forming the inner periphery guide portions 14a, 14a and 14a, 14a of the ball direction changing passages 14, 14 and 14, 14; and bilateral two rows of ball retainer member forming portions 33, 33 and 33, 33 forming the ball retainer members 23, 23 and 23, 23, are formed by a circulation passage forming member 30 which is formed integrally with the movable block body 6 by inserting the same into a mold. The circulation passage forming member 30 may be formed as a product of resin molding or aluminium die casting.

According to the manner mentioned above, the connected portions between the non-loaded ball return passages 11, 11 and 11, 11 and the direction changing passage inner periphery guide portions 14a, 14a and 14a, 14a and between the direction changing passage inner periphery guide portions 14a, 14a and 14a, 14a and the loaded ball rolling grooves 10, 10 and 10, 10 can be formed so as to provide substantially continuous surfaces with no stepped portion, enabling the ball rows 3, 3 and 3, 3 to smoothly circulate. Furthermore, since the ball retainer members 23, 23 and 23, 23 can be exactly positioned, the ball rows 3, 3, and 3, 3 can smoothly roll without contacting the ball retainer members 23, 23 and 23, 23 at the ball row moving time.

Still furthermore, according to the present embodiment, there are also formed chain guide portions 40, 40 for limiting deviation of the respective bilateral two ball rows 3, 3 and 3, 3 at a time when the ball rows are guided through the endless circulation passage by the connection members 21 of the plural ball row chains 20, 20.

The chain guide portions 40, 40 are provided with a loaded area guide portion 41 formed between the bilateral loaded ball rolling grooves 10, 10 and 10, 10; a direction changing area guide portion 42 formed between the direction changing inner periphery guide portions 14*a*, 14*a* and 14*a*, 14*a*; and a return area guide portion 43 formed between the ball return passages 11, 11 and 11, 11, the chain guide portions being integrally formed with the circulation passage forming member 30.

According to the structure mentioned above, since the plural ball row chains 20, 20 can be guided along the chain guide portions in the ball row circulation operation, the deviation or swinging of the ball row chains 20, 20 can be prevented and the ball circulation can be further smoothly performed.

Further, the direction changing passage guide portion forming portion 32, 32 is composed of the end plates 7 as end surface forming portions integrally formed to the end surfaces of the movable block body 6 inclusive of the direction changing passage inner periphery guide portions 14*a*, 14*a* and 14*a*, 14*a* and an area in the vicinity thereof. These end plates 7 are formed with recessed portions 34, 34 exposing the direction changing inner periphery guide portions 14*a*, 14*a* and 14*a*, 14*a*, and bilateral one deflectors 35, 35 respectively formed with the outer periphery guide portions 14*b*, 14*b* and 14*b*, 14*b* of the ball direction changing passages 14, 14 and 14, 14 are engaged with these recessed portions 34, 34, whereby the rolling member rolling direction changing passages 14, 14 and 14, 14 are constituted by the inner periphery guide portions 14*a*, 14*a* and 14*a*, 14*a* and the outer periphery guide portions 14*b*, 14*b* and 14*b*, 14*b*. It will be preferred to form the deflectors 35, 35 by a resin having wearproof property, large attenuation and large specific gravity.

According to the structure described above, the deflectors 35, 35 are positioned by the recessed portions 34, 34 formed to the end plates 7, 7 integrally formed with the movable block body 6, and moreover, the outer periphery guide portions 14*b*, 14*b* and 14*b*, 14*b* of the ball direction changing passages 14, 14 and 14, 14 can be also exactly positioned by means of the end plates 7. Since the recessed portions 35, 35 are formed integrally with the movable block body 6, the positional relationship between the recessed portions 35, 35 and the loaded ball rolling grooves 10, 10 and 10, 10 can be exactly set.

Furthermore, in the assembling working of the plural ball row chains 20, 20, the chains can be easily inserted from the recessed portions 34, 34, reducing the chain assembling working time. That is, by inserting the plural ball row chains 20, 20 preliminarily holding the necessary numbers of balls into the movable block 4 through the recessed portions 34, 34, the necessary numbers of balls can be quickly inserted without falling off.

[Another Embodiment]

FIG. 3 represents another embodiment of the present invention. In the former embodiment described above, the contact angle lines S1, S2, S3 and S4 constitute outwardly opened structure inclined bilaterally symmetrically in directions narrowing the distance therebetween towards the track rail side with respect to the horizontal line H passing the central portion between the upper and lower ball rows. However, in this embodiment, there is adopted a structure in which the contact angle lines S1, S2, S3 and S4 constitute inwardly opened structure inclined bilaterally symmetrically in directions widening the distance therebetween towards the track rail side with respect to the horizontal line H passing the central portion between the upper and lower ball rows.

In this embodiment, the ball retainer member 24 is disposed between the two ball rows 3, 3, and the maximum width C of the ball retainer member 24 is set to a value larger than the minimum width D of the two ball rows 3, 3 to thereby form a gap g between the retainer member 24 and the movable block 4 through which the connection member 21 of the plural ball chain 20 passes.

Accordingly, the two ball rows 3, 3 supported by the plural ball row chain 20 are held together with the plural ball row chain 20 by both the side edge portions of the ball retainer member 24 positioned inside the chain 20.

Both the ends of the ball retainer member 24 may be fixed to the deflector 35, and as shown in FIG. 3(*b*), both may be connected at the central portions thereof through the engagement between an engaging projection 24*a* and an engaging hole 24*b*, and otherwise, may be connected to the deflector 35, as shown in FIG. 3(*c*), at the end portion of the ball retainer member 24. Further, as the connection structure, there may be adopted a structure, for example, in which a projection 24*c* having a trapezoidal section, which is engaged with a dovetail groove 24*d* formed to the deflector 35, is formed to the end portion of the ball retainer member 24, and many other connection structures may be further adopted.

Since structures of this embodiment other than the above structures are substantially the same as those mentioned with reference to the former embodiment, the same reference numerals are added to members or portions corresponding to those in the former embodiment and the details thereof are not mentioned herein.

Further, in the case of the parallel contact angle lines of the above two ball rows, it may be possible to locate two ball retainer members 23, 23 outside the two ball rows 3, 3 as shown in FIG. 1 or to locate the ball retainer member 24 between the two ball rows 3, 3 as shown in FIG. 2.

Furthermore, in the above embodiment, although there is described the case of the linear motion guide device provided with two sets of two ball rows, the present invention is of course applicable to a case of single set of two ball rows.

As mentioned hereinabove, according to the present invention, the falling-off of the balls can be prevented by the combined structure of the ball retainer member and the plural ball row chain, and the hanging-down of the end portion of the plural ball row chain can be also prevented, so that the assembling working can be done without paying specific attention to the falling-off of the balls, thus improving the assembling workability.

Furthermore, according to the present invention, the return passage forming portion constituting the non-loaded ball returning passage corresponding to the two ball rows, the direction changing inner periphery guide portion forming portion constituting the inner periphery guide portion of the ball direction changing passage, and the ball retainer forming portion constituting the two ball retainer members positioned outside the plural ball row chain are constituted by the circulation passage forming portion integrally formed by inserting the movable block body into the mold. Accordingly, the connected portions between these portions are made continuous with no stepped portion, thus realizing the smooth ball circulation.

Still furthermore, since the ball retainer portion can be exactly positioned, the balls never contact the retainer portion at the time of the ball rolling movement and the balls can be smoothly rolled.

Still furthermore, the recessed portion exposing the direction changing passage inner periphery guide portion corresponding to the two ball rows are formed to the end surface forming portion formed to the end surface of the movable block body and the recessed portion is engaged with the deflector to thereby constitute the rolling member rolling direction changing passage, so that the deflector can be positioned by the recessed portion formed to the end surface forming portion integrally formed with the movable block body, and the outer periphery guide portion of the ball rolling direction changing passage can be also exactly positioned through the end surface forming portion, so that the positional relationship to the loaded ball rolling groove can be also exactly set, thus further achieving the smooth ball circulation.

Furthermore, in the assembling working of the plural ball row chain, the chain can be easily inserted through the recessed portion, thus reducing the chain assembling working.

Field of Industrial Usage

As mentioned above, the linear motion guide device provided with the plural ball row chain according to the present invention is usable for linear motion guide mechanisms for machine tools, industrial robots, measuring devices, etc.

I claim:

1. A linear motion guide device, provided with a plural ball row chain, which comprises a track rail and a movable block mounted to the track rail to be movable through a number of balls, said movable block comprising a movable block body provided with a loaded ball rolling groove corresponding to a loaded ball rolling groove formed to the track rail and a non-loaded ball return passage disposed in parallel to the loaded ball rolling groove of the movable block body and also provided with a direction changing passage forming members formed at both ends of the movable block body and constituting ball direction changing passages forming an endless ball circulation passage communicating the loaded ball rolling groove and the rolling member return passage, said balls being composed of at least one set of two ball rows in parallel to each other with a predetermined space and said two ball rows being supported by a belt-shaped plural ball row chain enabling the balls to circulate the endless ball circulation passage, said plural ball row chain being composed of a flexible connection member disposed between the two ball rows and spacers disposed at both side edges of the connection member and adapted to be inserted into adjacent balls, wherein a ball retainer portion is disposed to the movable block body so that the balls in respective ball rows along the loaded ball rolling groove are engaged at a time of removing the movable block from the track rail and the balls are prevented from falling off through an assembling of the ball retainer portion and the plural ball row chain.

2. A linear motion guide device provided with a plural ball row chain according to claim 1, wherein said ball retainer portion includes two retainer members disposed to side edge portion opposing to the location of the connection member of the plural ball row chain and an opening width of the retainer member is set smaller than a maximum width between balls of the respective ball rows.

3. A linear motion guide device provided with a plural ball row chain according to claim 1, wherein said ball retainer members are disposed between said two ball rows, a maximum width between the retainer members is set larger than a minimum width of two ball rows and a gap through which the connection member of the plural ball row chain passes is formed between the ball retainer portion and the movable block body.

4. A linear motion guide device provided with a plural ball row chain according to any one of claims 1 to 3, wherein a return passage forming portion constituting the non-loaded ball returning passage corresponding to the two ball rows, a direction changing inner periphery guide portion forming portion constituting an inner periphery guide portion of the ball direction changing passage, and a ball retainer forming portion constituting ball retainer members are constituted by a circulation passage forming portion integrally formed by inserting the movable block body into a mold.

5. A linear motion guide device provided with a plural ball row chain according to claim 4, wherein the direction changing passage inner periphery guide portion forming portion is composed of an end surface forming portion integrally formed with an end surface of the movable block body inclusive of the direction changing passage guide portion and an area in a vicinity thereof, a recessed portion exposing the direction changing passage inner periphery guide portion corresponding to ball rows is formed to said end surface forming portion, a deflector formed with an outer periphery guide portion of a rolling member rolling direction changing passage is engaged with the recessed portion, and the rolling member rolling direction changing passage is composed of said inner periphery guide portion and said outer periphery guide portion.

* * * * *